Figure 1:
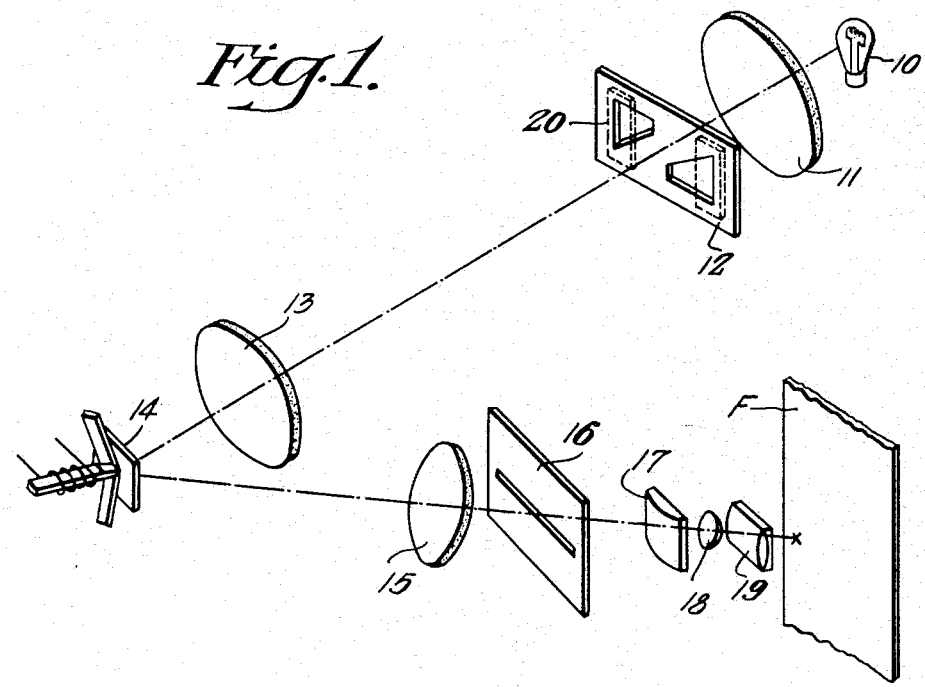

July 27, 1943.  G. L. DIMMICK  2,325,378
SOUND RECORDING OPTICAL SYSTEM
Filed June 30, 1939

Inventor
Glenn L. Dimmick
Attorney

Patented July 27, 1943

2,325,378

UNITED STATES PATENT OFFICE 2,325,378

SOUND RECORDING OPTICAL SYSTEM

Glenn L. Dimmick, Haddonfield, N. J., assignor to Radio Corporation of America, a corporation of Delaware Application June 30, 1939, Serial No. 282,288

5 Claims. (Cl. 88—24)

This invention relates to an optical system for the photographic recording of sound on film and, more particularly, to such an optical system for the purpose of producing wide sound records. In some instances, it is desirable to produce a sound record having substantially twice the customary width. One purpose of such a record is to provide a push-pull record of high fidelity which may be rerecorded with a very low ground noise level and one-half of which may also be reproduced, if desired, on a standard reproducer in the same manner as a standard sound track. Such a record, when so located on the film that one-half of it is in the same lateral position as a standard sound track, may be spliced to standard sound tracks, and the entire film length run through an ordinary reproducer and satisfactorily reproduced.

The producing of such a record involves difficulties in securing sufficiently bright illumination on the film and the optical system used for the recording is subject to severe mechanical limitations.

It would appear that the production of such a track would involve merely the doubling of all dimensions of a standard recording optical system, but this is not the case. The dimensions of the optical system which can be used are limited by the recorder construction. Further, if the dimensions of the optical system were doubled, then the intensity of the light source would have to be at least quadrupled, which is impractical due to the fact that present sources are operated at their maximum practical intensity. Any such mere change in dimensions would be further unsatisfactory in that the line of light on the film would be doubled in width as well as in length, and the slit imaged upon the film would therefore have to be retained at its present dimensions, thereby again decreasing the light to half of the otherwise available amount.

In the optical system hereinafter described, the foregoing disadvantages have been avoided and other advantages have been secured by the design of a special optical system using an objective lens of cylindrical characteristics and so designed that, in a standard commercial type of recorder, the present external dimensions of the optical system are retained and the optical dimensions of the system remain the same from the exciter lamp to the slit. The slit is imaged upon the film with the present reduction in size of the image lengthwise of the film, leaving the width of the line of light on the film the same. The length of the slit is imaged upon the film with about half the present reduction, thereby securing the required image dimensions with a minimum loss of light.

One object of the invention is to provide a recorder optical system for producing a sound track of approximately twice the standard width.

Another object of the invention is to provide an optical system for producing a photographic sound track of twice the standard width but with the same width of recording image upon the film as is customary.

Figure 2:
Figure 3:

Other and incidental objects of the invention will be apparent to those skilled in the art from a reading of the following specification and an inspection of the accompanying drawing, in which Figure 1 is a perspective schematic view of an optical system constructed according to this invention;

Figure 2 is a vertical section along the optical axis of the leg of the optical system of Figure 1 including the film; and Figure 3 is a horizontal section through Figure 2.

Referring first to Fig. 1, the usual exciter lamp 10 is provided. This exciter lamp may be the customary recording exciter lamp, but in the present instance, in order to provide brighter illumination to compensate for the greater image area, it may be desirable to use a high pressure mercury vapor lamp. The light from the source 10 passes through the condenser lens 11 to the aperture plate 12. In the present instance, aperture plate 12 is shown as provided with a double aperture, such as may be used for push-pull variable area recording. Light passing through the aperture in the plate 12 is directed by the lens 13 upon the galvanometer mirror 14. The lenses 11 and 13 together focus an image of the source 10 upon the mirror 14. Light reflected from the mirror 14 is directed by the lens 15 through the slit plate 16 to the objective composed of the lenses 17, 18 and 19, which in turn focuses an image of the plate 16 upon the film F. The lenses 13 and 15 together focus an image of the aperture plate 12 upon the slit plate 16, and the image is varied in accordance with the sound waves to be recorded by the galvanometer 14. Ground noise reduction shutters 20 may be provided.

It will be apparent that my invention is not limited to the use of variable area recording as described, which is the customary type of variable area push-pull recording, but that I may use either push-pull variable density, variable area recording of the double modulated type, or the variable area recording of the single modulated type, these several types of recording being shown, for example, in Neale Patent No. 1,879,423, my Patents Nos. 2,093,423, 2,095,317, 2,095,318, 2,096,576, Kellogg Patent No. 2,097,668, Baker Patent No. 2,102,776, my Reissue Patent No. 21,029, and my Patent No. 2,154,067.

In the present commercial sound recording optical systems of the RCA Photophone type, a spherical objective lens is used between the slit plate 16 and the film F, and this lens is of such focal length as to give a 7.5 to 1 reduction of the image of the slit in the plate 16 to the film F. The image on the film F has a width measured lengthwise of the film of .00025" and has a length, which is measured transversely of the film and which corresponds with the width of the sound track, of .076". In the present optical system, I desire to retain the same image width of .00025" but to secure an image length and sound track width of approximately .165". I accomplish this by making the objective composed of the lenses 17, 18 and 19 of such dimensions as to give the present 7.5 to 1 reduction in the vertical plane, and a reduction of 3.5 to 1 in the horizontal plane.

The objective lens is constructed as follows: The lens 17 is a plano-convex cylinder with its axis vertical and its convex side turned toward the slit plate 16. This lens is of ordinary crown glass and has a radius of curvature of 1.34", and a thickness of .160", and a focal length of 1.34". The second lens 18 is spaced at a distance of .552" from the lens 17 and is a spherical achromat identified as the Bausch and Lomb system 12KA from the standard microscope objective type 1021. This lens has a thickness of .145". The lens 19 is spaced a distance of .613" from the face of the lens 18 and is a one-radius doublet cylindrical lens. The face of this lens toward the film is a plane surface, while the two curved spherical surfaces have a radius of .229". The free aperture of this lens measures .150 x .300", and the thickness of the lens is .063". This lens 19 has a positive component of borosilicate crown glass and a negative component of dense flint.

The objective constructed as described gives the required 7.5 to 1 reduction in the vertical plane and the required 3.5 to 1 reduction in the horizontal plane. The lens 19 has its axis accurately transverse to the vertical plane and of course perpendicular to the plane of intersection of the axis of the lens 17 and the optical axis. The objective consisting of the lenses 17, 18 and 19 must be provided with an appropriate mount so that it can be focused by moving it along the optical axis without rotation.

I claim as my invention:

1. For use in a sound recording system having a slit plate and means for directing light modulated in accordance with the sound to be recorded upon said plate, an objective comprising three components for imaging the slit in said plate upon a film, said objective being so constructed and located as to reduce the image of the width of the slit in one ratio and to reduce the image of the length of the slit in a different ratio, two of said components being cylindrical components spaced apart with their axes perpendicular to the optical axis and at right angles to each other, said third component being spherical and positioned between said cylindrical components, the ratio of the distance between said cylindrical components to the distance between one of said cylindrical components and said spherical component being of the order of 2.11, and the image in both planes being in focus.

2. For use in a sound recording system having a slit plate and means for directing light modulated in accordance with the sound to be recorded upon said slit plate, an objective comprising three components for imaging the slit in said plate upon a film, the said objective being so constructed and located between said slit and said film as to reduce the image of the width of the slit in the ratio of the order of 7½ to 1, and to reduce the image of the length of the slit in the ratio of the order of 3½ to 1, two of said components being cylindrical components spaced apart with their axes perpendicular to the optical axis and at right angles to each other, and said third component being spherical and positioned between said cylindrical components, the ratio of the spacing between said cylindrical components to the spacing between one of said cylindrical components and said spherical component being of the order of 2.11.

3. For use in a sound recording system having a slit plate and means for directing light modulated in accordance with the sound to be recorded upon said slit plate, an objective comprising three components for imaging the slit in said plate upon a film, the said objective being so constructed and located between said slit and said film as to reduce the image of the width of the slit in one ratio and to reduce the image of the length of the slit in a different ratio, two of said components being cylindrical and having their axes perpendicular to the optical axis and at right angles to each other, said cylindrical component adjacent said slit having a focal length of substantially 1.34 inches, and said third component being spherical and positioned between said cylindrical component adjacent the film being achromatic, said cylindrical component having a plane surface toward the film, and the image in both planes being in focus.

4. For use in a sound recording system having a slit plate and means for directing light modulated in accordance with the sound to be recorded upon said slit plate, an objective comprising three components for imaging the slit in said plate upon a film, said objective being so constructed and located between said slit and said film as to reduce the image of the width of the slit in the ratio of the order of 7½ to 1 and to reduce the image of the length of the slit in the ratio of the order of 3½ to 1, two of said components being cylindrical with their axes perpendicular to the optical axis and at right angles to each other, and said third component being spherical and positioned between said cylindrical components, the cylindrical component adjacent the film being a one-radius doublet having a plane surface toward the film.

5. For use in a sound recording system having a slit plate and means for directing light modulated in accordance with the sound to be recorded upon said slit plate, an objective comprising three components for imaging the slit on said plate upon a film, the said objective being so constructed and located between said slit and said film as to reduce the image of the width of the slit in the ratio of the order of 7½ to 1 and to reduce the image of the length of the slit in the ratio of the order of 3½ to 1, two of said components being cylindrical with their axes perpendicular to the optical axis and at right angles to each other and spaced approximately 1.165 inches apart, and said third component being spherical and positioned between said cylindrical components and spaced approximately .552 inch from said cylindrical component adjacent said slit, both the spherical component and the cylindrical component adjacent the film being achromatic.

GLENN L. DIMMICK.